(12) United States Patent
Hodgson

(10) Patent No.: US 11,318,892 B2
(45) Date of Patent: May 3, 2022

(54) VEHICLE INTERIOR COMPONENT

(71) Applicant: Shanghai Yanfeng Jinqiao Automotive Trim Systems Co. Ltd., Novi, MI (US)

(72) Inventor: Thomas Scott Hodgson, Holland, MI (US)

(73) Assignee: Shanghai Yanfeng Jinqiao Automotive Trim Systems Co. Ltd., Novi, MI (US)

(*) Notice: Subject to any disclaimer, the term of this patent is extended or adjusted under 35 U.S.C. 154(b) by 278 days.

(21) Appl. No.: 16/850,558

(22) Filed: Apr. 16, 2020

(65) Prior Publication Data

US 2020/0331400 A1  Oct. 22, 2020

Related U.S. Application Data (60) Provisional application No. 62/836,229, filed on Apr. 19, 2019.

(51) Int. Cl.
*B60R 7/04* (2006.01)
*E05B 83/32* (2014.01)

(52) U.S. Cl.
CPC .............. *B60R 7/04* (2013.01); *E05B 83/32* (2013.01)

(58) Field of Classification Search
CPC .......... B60R 7/04; E05B 83/32; E05C 19/022
USPC .......................... 296/37.12, 24.34, 37.8, 37.1
See application file for complete search history.

(56) References Cited

U.S. PATENT DOCUMENTS

| | | | |
|---|---|---|---|
| 3,621,510 A | 11/1971 | Rollins, Jr. | |
| 4,052,093 A | 10/1977 | Fattori | |
| 5,845,954 A * | 12/1998 | DePue | B60R 7/06 312/328 |
| 6,247,733 B1 * | 6/2001 | Weiland | E05C 19/022 292/228 |
| 6,802,550 B1 * | 10/2004 | Griggs, Jr. | E05B 83/32 292/136 |
| 6,808,214 B2 * | 10/2004 | Sato | E05B 77/06 292/341.15 |
| 7,097,220 B2 * | 8/2006 | Haba | E05B 77/02 292/DIG. 4 |

(Continued)

FOREIGN PATENT DOCUMENTS

DE  202012010950 U1  3/2014
DE  102014009465 A1  12/2015

(Continued)

*Primary Examiner* — D Glenn Dayoan
*Assistant Examiner* — E Turner Hicks (57) ABSTRACT

A component for use in a vehicle that may be subjected to an event/external force is disclosed. The component may comprise a bin; a cover moveable between closed and open positions; a latch mechanism to hold and release the cover; a catch mechanism moveable to a blocking position to prevent the cover from opening. The cover may be retained by the catch mechanism in the closed position. The catch mechanism may comprise a pin moveable relative to the cover within a catch/track of the cover. The catch mechanism may move from the blocking position to a second blocking position to prevent the cover from opening. The catch mechanism may release the cover to facilitate opening of the cover in response to (a) a first actuating force applied to the cover; (b) release of the first actuating force; and (c) a second actuating force applied to the cover.

20 Claims, 7 Drawing Sheets

(56) References Cited

U.S. PATENT DOCUMENTS

| | | | |
|---|---|---|---|
| 7,481,468 B2 | 1/2009 | Merideth et al. | |
| 7,793,995 B2 | 9/2010 | King et al. | |
| 7,845,701 B2* | 12/2010 | Muller | B60R 7/04 |
| | | | 296/37.13 |
| 8,123,261 B2 | 2/2012 | Kikuchi et al. | |
| 8,191,953 B2* | 6/2012 | Simon | E05B 77/06 |
| | | | 296/1.04 |
| 8,215,684 B2 | 7/2012 | Whitens et al. | |
| 8,393,651 B2* | 3/2013 | Suzuki | E05B 77/06 |
| | | | 292/332 |
| 8,398,127 B2* | 3/2013 | Persiani | B60K 15/05 |
| | | | 292/137 |
| 8,449,001 B2 | 5/2013 | Whitens et al. | |
| 8,727,399 B2 | 5/2014 | Russell et al. | |
| 8,961,062 B2 | 2/2015 | Gillis et al. | |
| 9,523,222 B2 | 12/2016 | Zhang et al. | |
| 9,714,530 B2* | 7/2017 | Amick | E05B 77/12 |
| 9,771,743 B2 | 9/2017 | Roychoudhury et al. | |
| 2002/0171251 A1 | 11/2002 | Bieck et al. | |
| 2015/0197966 A1 | 7/2015 | Regnault et al. | |
| 2015/0315824 A1 | 11/2015 | Gotzen et al. | |
| 2015/0354250 A1 | 12/2015 | Bendel et al. | |
| 2017/0159328 A1* | 6/2017 | Roychoudhury | B60R 21/045 |
| 2019/0136592 A1 | 5/2019 | Muntean et al. | |
| 2020/0002979 A1* | 1/2020 | Ketels | E05B 81/04 |
| 2020/0231113 A1* | 7/2020 | Weichsel | E05B 77/08 |
| 2021/0146847 A1* | 5/2021 | Fukui | B60R 7/04 |

FOREIGN PATENT DOCUMENTS

| | | |
|---|---|---|
| EP | 2133495 B1 | 11/2012 |
| EP | 3027830 B1 | 2/2018 |
| KR | 101209605 B1 | 12/2012 |
| WO | 2019010086 A1 | 1/2019 |

* cited by examiner

VEHICLE INTERIOR COMPONENT

CROSS-REFERENCE TO RELATED APPLICATIONS

The present application claims priority to and incorporates by reference in full the following patent application: U.S. Provisional Patent Application No. 62/836,229 titled "VEHICLE INTERIOR COMPONENT" filed Apr. 19, 2019.

FIELD

The present invention relates to a vehicle interior component.

BACKGROUND

It is known to provide in a vehicle interior a component comprising a base with a compartment and a cover movable relative to the base to facilitate access to the compartment.

It would be advantageous to provide an improved vehicle interior component configured for improved functionality and operation comprising features (and combinations of features) as shown and described in the present application including a blocking mechanism for the cover.

SUMMARY

The present invention relates to a component for a vehicle interior configured for use in a vehicle that may be subjected to an event comprising application of an external force greater than a threshold force to the vehicle comprising: a base; a cover configured to move between a closed position and an open position relative to the base; a latch mechanism configured to retain the cover in the closed position; and a catch mechanism configured for actuation to a blocked position during the event to retain the cover in the closed position and blocked from movement to the open position. The catch mechanism may be configured for actuation to an unblocked position following the event to release the cover from the closed position. Following the event, the catch mechanism may be actuated from the blocked position to the unblocked position in order to move the cover from the closed position to the open position. Actuation of the catch mechanism from the blocked position to the unblocked position may comprise (a) movement at the catch mechanism from a retained state toward a transition state with the cover retained in the closed position and (b) movement at the catch mechanism from a retained state to a release state with the cover able to move toward the open position. Actuation of the catch mechanism from the blocked position to the unblocked position may comprise (a) movement at the catch mechanism from a retained state toward a transition state with the cover retained in the closed position and (b) movement at the catch mechanism from a retained state to a release state with the cover able to move toward the open position. Actuation of the catch mechanism from the blocked position to the unblocked position may comprise (a) movement at the catch mechanism from a retained state toward a transition state with the cover retained in the closed position and (b) movement at the catch mechanism from a retained state toward a release state with the cover able to move toward the open position. Actuation of the catch mechanism to the blocked position may comprise movement at the catch mechanism to the retained state. Actuation of the catch mechanism to the unblocked position may comprise movement at the catch mechanism to the release state. Actuation of the catch mechanism from the blocked position to the unblocked position may comprise (a) movement at the catch mechanism from a retained state toward a transition state with the cover retained in the closed position and (b) movement at the catch mechanism from a retained state toward a transition state with the cover retained in the closed position and (c) movement at the catch mechanism from a retained state toward a release state with the cover able to move toward the open position. Movement at the catch mechanism may comprise movement of the cover by application of force. The catch mechanism may be configured for movement from a transition state to a retained state. Movement at the catch mechanism may comprise movement from a transition state to a retained state. Movement at the catch mechanism may comprise movement from a transition state to a retained state. Movement at the catch mechanism may comprise movement from a transition state to a retained state. Movement at the catch mechanism may comprise movement from a transition state to a retained state. Movement at the catch mechanism may comprise movement from the released state toward an open state. The catch mechanism may comprise a blocker mechanism. The catch mechanism may comprise an inertia latch mechanism. The catch mechanism may comprise a catch and an arm configured to engage the catch. The cover may comprise the catch and the base may comprise the arm. The catch may comprise a track and the arm may comprise a pin configured to engage the track. The catch mechanism may comprise a spring configured to bias the arm to retain the catch mechanism in a default position so that the cover can be moved to the open position. Movement at the catch mechanism may comprise movement of the arm relative to the catch. Movement at the catch mechanism may comprise movement of the arm and movement of the catch. Movement at the catch mechanism may comprise movement of the arm relative to the catch and movement of the catch relative to the arm. Movement at the catch mechanism may comprise movement of the pin of the arm relative to the track of the catch. Movement at the catch mechanism to the blocked position may comprise application of force greater than the threshold force. Actuation of the catch mechanism from the blocked position to the unblocked position may comprise (a) application of force to provide movement at the catch mechanism from a retained state to a transition state and (b) application of force to provide movement at the catch mechanism from a retained state to a release state.

The present invention relates to a component for a vehicle interior configured for use in a vehicle that may be subjected to an event comprising application of an external force greater than a threshold force to the vehicle comprising: a base; a cover configured to move between a closed position and an open position relative to the base; a latch mechanism configured to retain the cover in the closed position; and a catch mechanism configured for actuation to a blocked position during the event to retain the cover in the closed position and blocked from movement to the open position. The catch mechanism may be configured for actuation to an unblocked position following the event to release the cover from the closed position. Following the event, the catch mechanism may be actuated from the blocked position to the unblocked position in order to move the cover from the closed position to the open position. Actuation of the catch mechanism from the blocked position to the unblocked position may comprise (a) application of force to provide movement at the catch mechanism from a retained state to a transition state and (b) application of force to provide movement at the catch mechanism from a retained state to a release state. Actuation of the catch mechanism from the blocked position to the unblocked position may comprise (a) movement at the catch mechanism from a retained state toward a transition state with the cover retained in the closed position and (b) movement at the catch mechanism from a retained state toward a release state with the cover able to move toward the open position. The catch mechanism may be configured so that (a) the cover is retained in the closed position after application of force to provide movement at the catch mechanism from a retained state to a transition state and (b) the cover is able to move toward the open position after application of force to provide movement at the catch mechanism from a retained state to a release state. Movement at the catch mechanism to the blocked position may comprise application of force greater than the threshold force. The catch mechanism may comprise a blocker.

The present invention relates to a component for a vehicle interior configured for use in a vehicle that may be subjected to an event comprising application of an external force greater than a threshold force to the vehicle comprising: a base; a cover configured to move between a closed position and an open position relative to the base; a latch mechanism configured to retain the cover in the closed position; and a catch mechanism configured for actuation to a blocked position during the event to retain the cover in the closed position and blocked from movement to the open position. The catch mechanism may be configured for actuation to an unblocked position following the event to release the cover from the closed position. Following the event, the catch mechanism may be actuated from the blocked position to the unblocked position in order to move the cover from the closed position to the open position. The catch mechanism may comprise a catch on the cover and an arm on the base. The catch may comprise a track and the arm may comprise a pin configured to engage the track. Actuation of the catch mechanism from the blocked position to the unblocked position may comprise (a) movement at the catch mechanism from a retained state toward a transition state with the cover retained in the closed position and (b) movement at the catch mechanism from a retained state to a release state with the cover able to move toward the open position. Actuation of the catch mechanism from the blocked position to the unblocked position may comprise (a) application of force to provide movement at the catch mechanism from a retained state to a transition state and (b) application of force to provide movement at the catch mechanism from a retained state to a release state.

The present invention relates to a component for a vehicle interior configured for use in a vehicle subjected in operation to at least one external force such as an applied force comprising a base comprising a bin; a cover configured to move between (a) a closed position to cover the bin and (b) an open position to uncover the bin; a latch mechanism configured to (a) hold the cover in the closed position; (b) release the cover to facilitate movement of the cover toward the open position; and a blocker mechanism configured to move from a default position to a blocking position to prevent the cover from moving toward the open position in response to the applied force exceeding a predetermined amount. The cover may be configured for movement to (a) a first state with the cover retained by the latch mechanism in the closed position; (b) a second state with the cover retained by the blocker mechanism in the closed position; (c) a third state with the cover released from the blocker mechanism in the closed position; (d) a fourth state with the cover in the open position. The blocker mechanism may be configured to move from the blocking position to a second blocking position to prevent the cover from moving toward the open position. The blocker mechanism may be configured to move from the blocking position to the second blocking position in response to an actuating force applied to the cover. The blocker mechanism may be configured to move (a) from the blocking position to a second blocking position to prevent the cover from moving from the closed position toward the open position; and (b) from the second blocking position to the default position to facilitate movement of the cover toward the open position. The blocker mechanism may comprise a pin and a catch. The catch may comprise a track; the pin may be configured to move within the track. The blocker mechanism may comprise an arm configured to hold the blocker mechanism in the default position. The arm may be configured to allow movement of the blocker mechanism from the default position to the blocking position in response to the applied force exceeding the predetermined amount. The arm may comprise a pendulum. The blocker mechanism may comprise a spring configured to bias the arm to hold the blocker mechanism in the default position.

The present invention relates to a component for a vehicle interior configured for use in a vehicle subjected in operation to at least one external force such as an applied force comprising a base comprising a bin; a cover configured to move between (a) a closed position to cover the bin and (b) an open position to uncover the bin; a latch mechanism configured to (a) hold the cover in the closed position; (b) release the cover to facilitate movement of the cover toward the open position; and a blocker mechanism configured to move from a default position to a blocking position to prevent the cover from moving toward the open position in response to the applied force exceeding a predetermined amount. The blocker mechanism may be configured to hold the cover in the closed position.

The present invention relates to a component for a vehicle interior configured for use in a vehicle subjected in operation to at least one external force such as an applied force comprising a base comprising a bin; a cover configured to move between (a) a closed position to cover the bin and (b) an open position to uncover the bin; a latch mechanism configured to (a) hold the cover in the closed position; (b) release the cover to facilitate movement of the cover toward the open position; and a blocker mechanism configured to move from a default position to a blocking position to prevent the cover from moving toward the open position in response to the applied force exceeding a predetermined amount. The blocker mechanism may comprise a pin and a catch; the cover may comprise the catch; the pin may be configured to move relative to the cover in response to the applied force exceeding a predetermined amount.

The present invention relates to a component for a vehicle interior configured for use in a vehicle subjected in operation to at least one external force such as an applied force comprising a base comprising a bin; a cover configured to move between (a) a closed position to cover the bin and (b) an open position to uncover the bin; a latch mechanism configured to (a) hold the cover in the closed position; (b) release the cover to facilitate movement of the cover toward the open position; and a blocker mechanism configured to move from a default position to a blocking position to prevent the cover from moving toward the open position in response to the applied force exceeding a predetermined amount. The blocker mechanism may be configured to move from the blocking position to a second blocking position to prevent the cover from moving toward the open position.

The present invention relates to a component for a vehicle interior configured for use in a vehicle subjected in operation to at least one external force such as an applied force comprising a base comprising a bin; a cover configured to move between (a) a closed position to cover the bin and (b) an open position to uncover the bin; a latch mechanism configured to (a) hold the cover in the closed position; (b) release the cover to facilitate movement of the cover toward the open position; and a blocker mechanism configured to move from a default position to a blocking position to prevent the cover from moving toward the open position in response to the applied force exceeding a predetermined amount. The blocker mechanism may be configured to release the cover to facilitate movement of the cover toward the open position in response to (a) a first actuating force applied to the cover; (b) release of the first actuating force; and (c) a second actuating force applied to the cover.

DESCRIPTION

According to an exemplary embodiment as shown schematically in FIGS. 1A through 1D, a vehicle V is shown including an interior I with a vehicle interior component shown as floor console FC. Floor console FC may comprise a base with a compartment or bin shown as a storage compartment with an opening and a door configured to be (or provide) a cover C for the compartment. The door or cover C may be configured to move between a closed position and an open position to facilitate access (through the opening) to the storage compartment.

According to an exemplary embodiment as shown schematically in FIGS. 2A through 2D, a vehicle interior component 4000 shown as a console may comprise a cover 4100 and a base 4200. Cover 4100 may be coupled to base 4200 and may be configured for movement between a closed or latched position and an open position in response to an external force. According to an exemplary embodiment, base 4200 may comprise a bin or storage compartment SC and cover 4100 may be configured to cover bin or storage compartment SC in the closed or latched position as shown schematically in FIG. 2A and uncover bin or storage compartment SC in the open position as shown schematically in FIG. 2D. Cover 4100 may comprise a door.

According to an exemplary embodiment as shown schematically in FIGS. 3A through 3E, cover 4100 may comprise a slot 4102 and base 4200 may comprise a latch or latch mechanism 4500. Latch 4500 may engage with a protrusion in slot 4102 to retain cover 4100 in the closed or latched position as shown schematically in FIGS. 3A and 3B. By application of an external force, cover 4100 may be rotated/pushed (e.g. downward) toward an unlatched position and latch 4500 may disengage the protrusion in slot 4102 as shown schematically in FIG. 3C. Latch 4500 may move along slot 4102 as cover 4100 moves from the unlatched position toward an open position. (See FIGS. 3D and 3E.)

According to an exemplary embodiment as shown schematically in FIGS. 4A through 4D, a conventional vehicle interior component 2000 shown as a console may comprise a cover 2100 and a base 2200. Cover 2100 may be coupled to base 2200 and may be configured for movement between a closed position and an open position in response to an external force. According to an exemplary embodiment, base 2200 may comprise a storage compartment and cover 2100 may be configured to cover the storage compartment in the closed position and uncover the storage compartment in the open position. By application of an external force FO acting against the center of gravity of cover 2100, cover 2100 is rotated (e.g. downward) toward an unlatched position and a conventional spring provides a force to move cover 2100 from the unlatched position toward an open position.

According to an exemplary embodiment as shown schematically in FIGS. 2A-2D, 3A-3E, 5A-5F and 6A-6L, a vehicle interior component 4000 shown as a console may comprise a cover 4100, a base 4200 and a blocker mechanism 4300. Blocker mechanism 4300 may comprise a catch mechanism. Cover 4100 may be coupled to base 4200 and may be configured for movement from a closed position (as shown schematically in FIGS. 2A, 3B, 5E and 6D) to an open position (as shown schematically in FIGS. 2D, and 3E) in response to an external force. According to an exemplary embodiment, base 4200 may comprise a bin/storage compartment SC and cover 4100 may be configured to cover bin/storage compartment SC in the closed position as shown schematically in FIG. 2A and uncover bin/storage compartment SC in the open position as shown schematically in FIG. 2D. Cover 4100 may comprise a door. Blocker mechanism 4300 may be configured to move from a retracted position (as shown schematically in FIGS. 2A-2D, 3A, 5E and 5F) to an extended position (as shown schematically in FIGS. 6D-6F) to prevent cover 4100 from moving from the closed position toward the open position. Vehicle interior component 4000 may comprise a spring 4400 configured to move door 4100 from the closed position to the open position.

According to an exemplary embodiment as shown schematically in FIGS. 2A-2D, 3A-3E, 5A-5F and 6A-6L, cover 4100 may comprise at least one of (a) a slot 4102; (b) a catch 4100a. Catch 4100a may comprise a track 4100t.

According to an exemplary embodiment as shown schematically in FIGS. 2A-2D, 3A-3E, 5A-5F and 6A-6L, blocker mechanism 4300 may comprise at least one of (a) a blocker or keeper 4308; (b) a spring shown as a cantilever spring 4310; (c) an arm shown as a pendulum 4312; (d) a spring 4316; (e) a pin 4308p; (f) a fastener F; (g) a washer W.

Exemplary Embodiments

According to an exemplary embodiment as shown schematically in FIGS. 6A-6M and TABLE A, the structure/function of the component is shown in operation including during/following an event (e.g. opening/closing, latching/retaining, etc. under an applied/external force such as an inertia force).

TABLE A

COVER LATCHING FUNCTION/OPERATION

| Position of Pin (4308p) | Input | Position of Cover |
|---|---|---|
| P1 | During application of inertia force | Moving from closed position toward over-travel position |
| P2 | During application of inertia force | Over-travel/bottomed out |
| P3 | After application of inertia force | Closed |
| P4 | At application of first push attempt | Over-travel/bottomed out |
| P5 | After application of first push attempt | Closed |
| P6 | At application of second push attempt | Over-travel/bottomed out |
| P7 | After application of second push attempt | Closed |
| P8 | At application of third push attempt | Over-travel/bottomed out |
| P9 | After application of third push attempt | Moving toward the open position |
| P10 | After application of third push attempt | Open position |

According to an exemplary embodiment as shown schematically in FIGS. 2A-2D, 3A-3E, 5A-5F and 6A-6L, a component 4000 for a vehicle interior configured for use in a vehicle that may be subjected to an event comprising application of an external force greater than a threshold force to the vehicle may comprise: a base 4200; a cover 4100 configured to move between a closed position and an open position relative to the base; a latch mechanism 4500 configured to retain the cover in the closed position; and a catch mechanism 4300 configured for actuation to a blocked position during the event to retain the cover in the closed position and blocked from movement to the open position. The catch mechanism may be configured for actuation to an unblocked position following the event to release the cover from the closed position. Following the event, the catch mechanism may be actuated from the blocked position to the unblocked position in order to move the cover from the closed position to the open position. Actuation of the catch mechanism from the blocked position to the unblocked position may comprise (a) movement at the catch mechanism from a retained state toward a transition state with the cover retained in the closed position and (b) movement at the catch mechanism from a retained state to a release state with the cover able to move toward the open position. Actuation of the catch mechanism from the blocked position to the unblocked position may comprise (a) movement at the catch mechanism from a retained state (P3) toward a transition state (P4) with the cover retained in the closed position and (b) movement at the catch mechanism from a retained state (P7) to a release state (P8) with the cover able to move toward the open position. See TABLE A and FIG. 6M. Actuation of the catch mechanism from the blocked position to the unblocked position may comprise (a) movement at the catch mechanism from a retained state (P3, P5) toward a transition state (P4, P6) with the cover retained in the closed position and (b) movement at the catch mechanism from a retained state (P7) toward a release state (P8) with the cover able to move toward the open position. Actuation of the catch mechanism to the blocked position may comprise movement at the catch mechanism to the retained state (P3). Actuation of the catch mechanism to the unblocked position may comprise movement at the catch mechanism to the release state (P8). Actuation of the catch mechanism from the blocked position to the unblocked position may comprise (a) movement at the catch mechanism from a retained state (P3) toward a transition state (P4) with the cover retained in the closed position and (b) movement at the catch mechanism from a retained state (P5) toward a transition state (P6) with the cover retained in the closed position and (c) movement at the catch mechanism from a retained state (P7) toward a release state (P8) with the cover able to move toward the open position. Movement at the catch mechanism may comprise movement of the cover by application of force. The catch mechanism may be configured for movement from a transition state to a retained state. Movement at the catch mechanism may comprise movement from a transition state (P2) to a retained state (P3). Movement at the catch mechanism may comprise movement from a transition state (P4) to a retained state (P5). Movement at the catch mechanism may comprise movement from a transition state (P6) to a retained state (P7). Movement at the catch mechanism may comprise movement from a transition state (P4, P6) to a retained state (P5, P7). Movement at the catch mechanism may comprise movement from the released state (P8) toward an open state (P10). The catch mechanism may comprise a blocker mechanism. The catch mechanism may comprise an inertia latch mechanism. The catch mechanism may comprise a catch 4100a and an arm 4312 configured to engage the catch. The cover may comprise the catch and the base may comprise the arm. The catch may comprise a track 4100t and the arm may comprise a pin 4308p configured to engage the track. The catch mechanism may comprise a spring 4316 configured to bias the arm to retain the catch mechanism in a default position so that the cover can be moved to the open position. Movement at the catch mechanism may comprise movement of the arm relative to the catch. Movement at the catch mechanism may comprise movement of the arm and movement of the catch. Movement at the catch mechanism may comprise movement of the arm relative to the catch and movement of the catch relative to the arm. Movement at the catch mechanism may comprise movement of the pin of the arm relative to the track of the catch. Movement at the catch mechanism to the blocked position may comprise application of force greater than the threshold force. Actuation of the catch mechanism from the blocked position to the unblocked position may comprise (a) application of force to provide movement at the catch mechanism from a retained state (P3) to a transition state (P4) and (b) application of force to provide movement at the catch mechanism from a retained state (P7) to a release state (P8).

According to an exemplary embodiment as shown schematically in FIGS. 2A-2D, 3A-3E, 5A-5F and 6A-6L, a component 4000 for a vehicle interior configured for use in a vehicle that may be subjected to an event comprising application of an external force greater than a threshold force to the vehicle may comprise: a base 4200; a cover 4100 configured to move between a closed position and an open position relative to the base; a latch mechanism 4500 configured to retain the cover in the closed position; and a catch mechanism 4300 configured for actuation to a blocked position during the event to retain the cover in the closed position and blocked from movement to the open position. The catch mechanism may be configured for actuation to an unblocked position following the event to release the cover from the closed position. Following the event, the catch mechanism may be actuated from the blocked position to the unblocked position in order to move the cover from the closed position to the open position. Actuation of the catch mechanism from the blocked position to the unblocked position may comprise (a) application of force to provide movement at the catch mechanism from a retained state to a transition state and (b) application of force to provide movement at the catch mechanism from a retained state to a release state. Actuation of the catch mechanism from the blocked position to the unblocked position may comprise (a) movement at the catch mechanism from a retained state (P3) toward a transition state (P4) with the cover retained in the closed position and (b) movement at the catch mechanism from a retained state (P7) toward a release state (P8) with the cover able to move toward the open position. See TABLE A and FIG. 6M. The catch mechanism may be configured so that (a) the cover is retained in the closed position after application of force to provide movement at the catch mechanism from a retained state to a transition state and (b) the cover is able to move toward the open position after application of force to provide movement at the catch mechanism from a retained state to a release state. Movement at the catch mechanism to the blocked position may comprise application of force greater than the threshold force. The catch mechanism may comprise a blocker 4308.

According to an exemplary embodiment as shown schematically in FIGS. 2A-2D, 3A-3E, 5A-5F and 6A-6L, a component 4000 for a vehicle interior configured for use in a vehicle that may be subjected to an event comprising application of an external force greater than a threshold force to the vehicle may comprise: a base 4200; a cover 4100 configured to move between a closed position and an open position relative to the base; a latch mechanism 4500 configured to retain the cover in the closed position; and a catch mechanism 4300 configured for actuation to a blocked position during the event to retain the cover in the closed position and blocked from movement to the open position. The catch mechanism may be configured for actuation to an unblocked position following the event to release the cover from the closed position. Following the event, the catch mechanism may be actuated from the blocked position to the unblocked position in order to move the cover from the closed position to the open position. The catch mechanism may comprise a catch 4100a on the cover and an arm 4312 on the base. The catch may comprise a track 4100t and the arm may comprise a pin 4308p configured to engage the track. Actuation of the catch mechanism from the blocked position to the unblocked position may comprise (a) movement at the catch mechanism from a retained state (P3) toward a transition state (P4) with the cover retained in the closed position and (b) movement at the catch mechanism from a retained state (P7) to a release state (P8) with the cover able to move toward the open position. See TABLE A and FIG. 6M. Actuation of the catch mechanism from the blocked position to the unblocked position may comprise (a) application of force to provide movement at the catch mechanism from a retained state (P3) to a transition state (P4) and (b) application of force to provide movement at the catch mechanism from a retained state (P7) to a release state (P8).

Figures 1A, 1B, 1C, 1D:
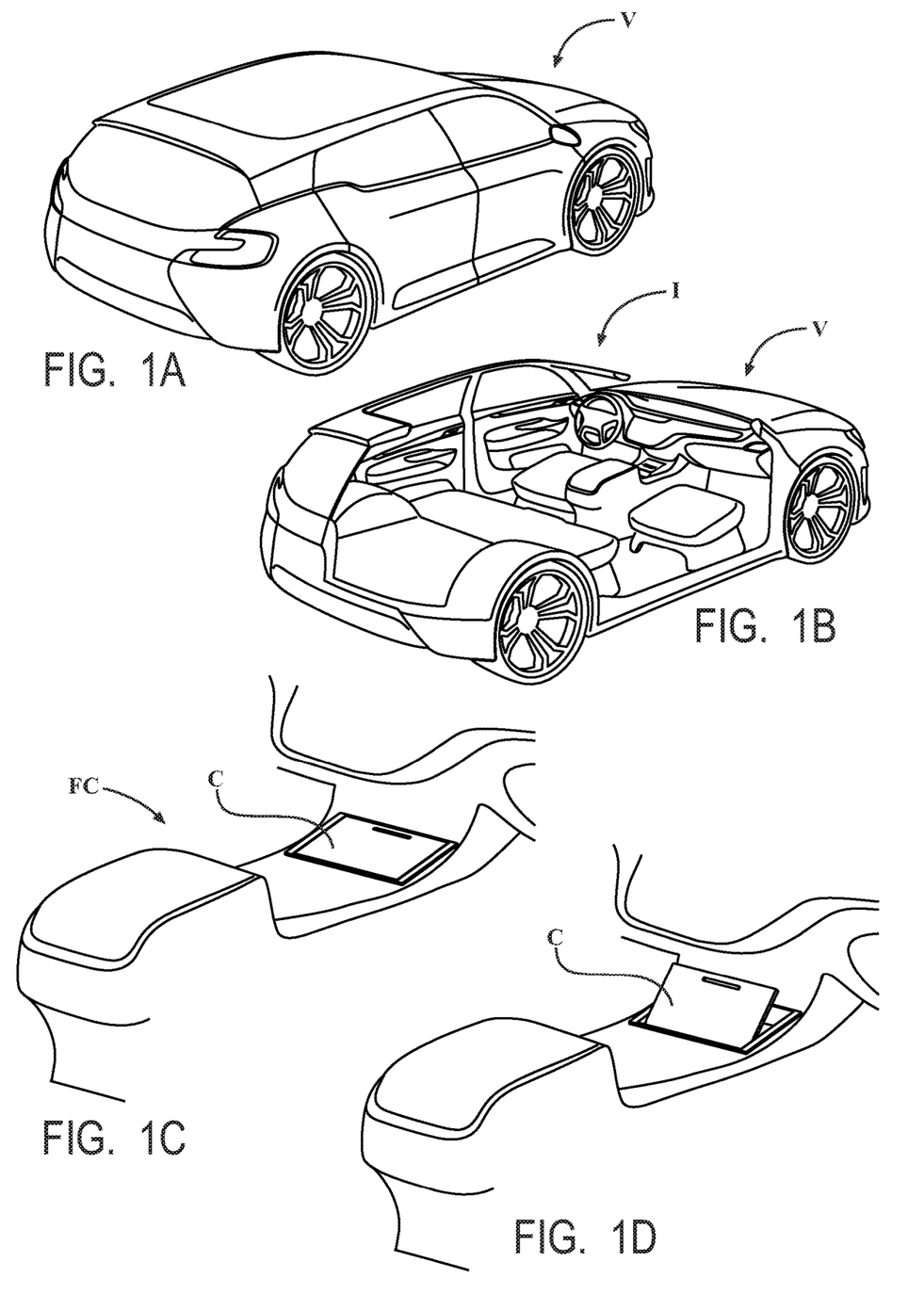
FIG. 1A is a schematic perspective view of a vehicle according to an exemplary embodiment.
FIG. 1B is a schematic perspective view of a vehicle showing a vehicle interior according to an exemplary embodiment.
FIGS. 1C through 1D are schematic perspective views of a vehicle interior component shown as a console assembly according to an exemplary embodiment.
Figures 2A, 2B, 2C, 2D:
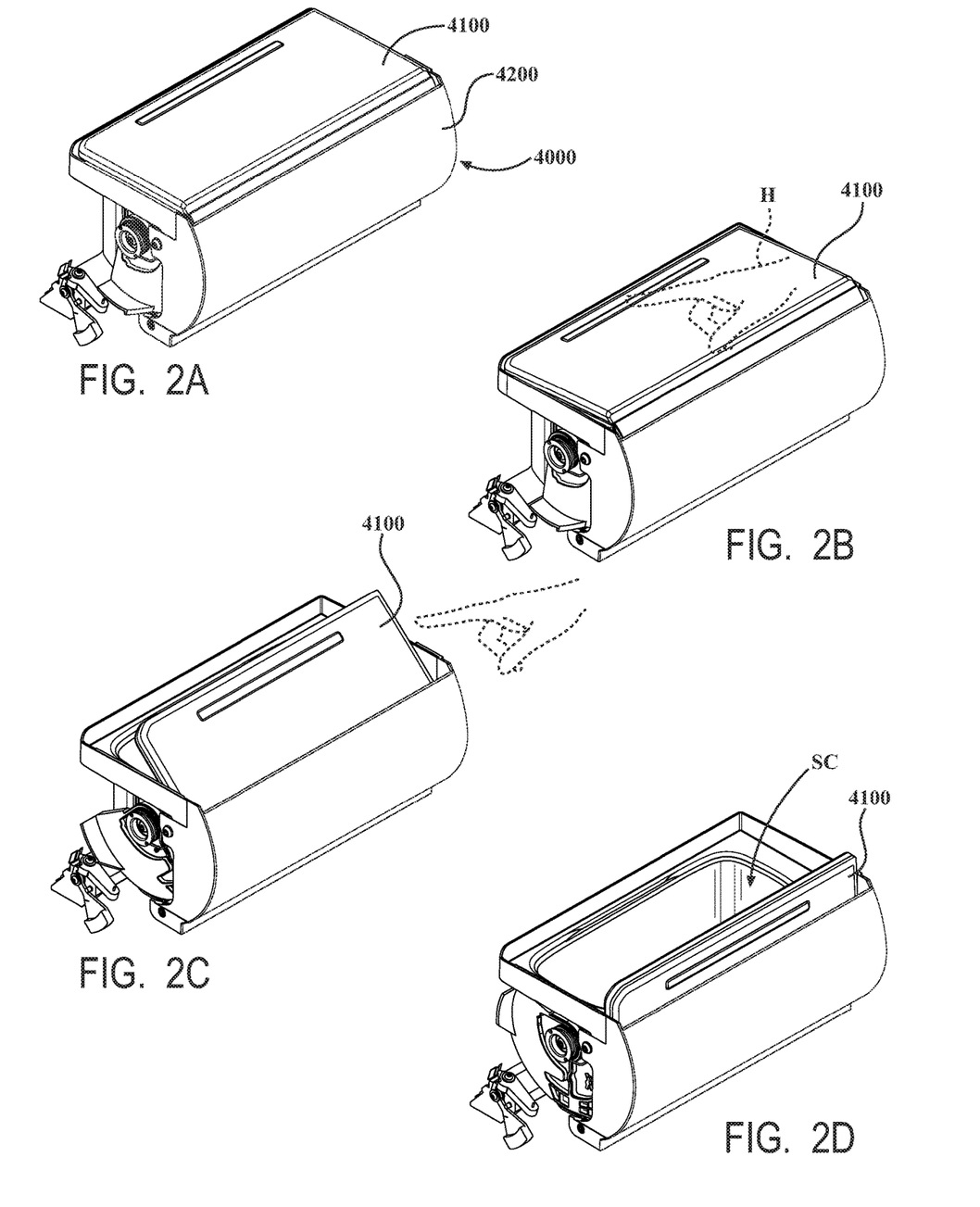
FIGS. 2A through 2D are schematic perspective views of a vehicle interior component shown as a console assembly according to an exemplary embodiment.
Figure 3A:
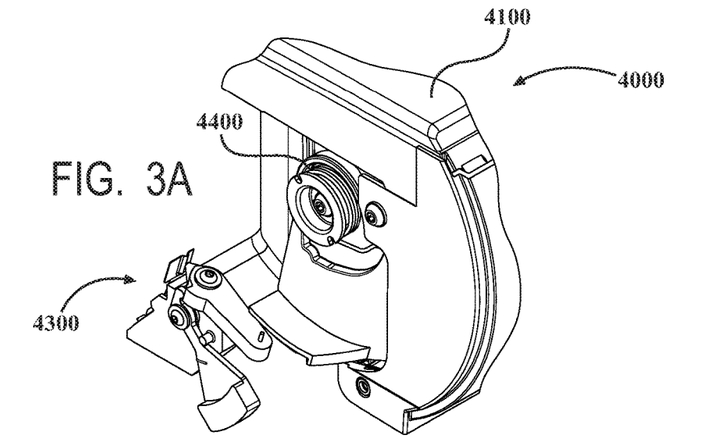
FIG. 3A is a schematic partial perspective view of a vehicle interior component shown as a console assembly according to an exemplary embodiment.
Figure 3B:
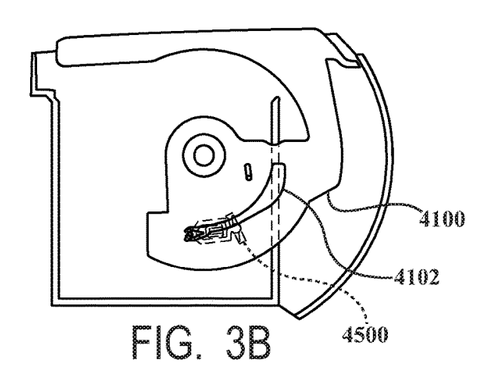
FIGS. 3B through 3E are schematic side views of the operation of a vehicle interior component shown as a console assembly according to an exemplary embodiment.
Figure 3C:
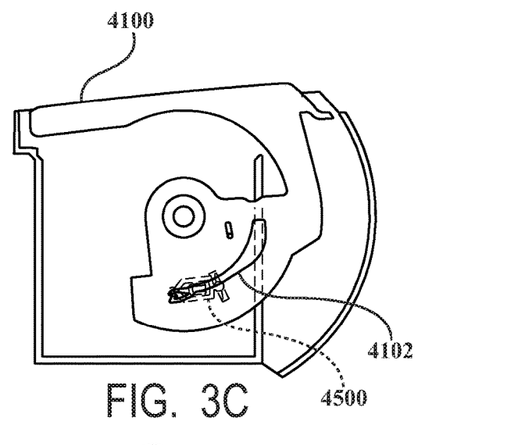
Figure 3D:
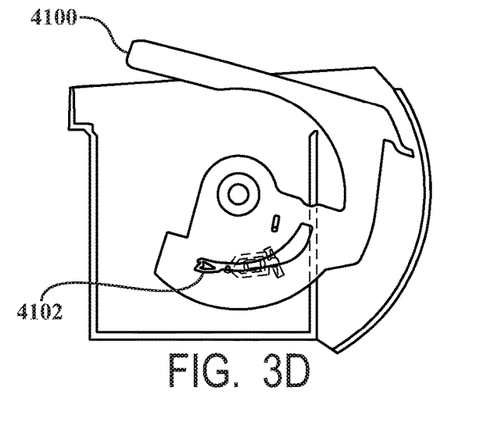
Figure 3E:
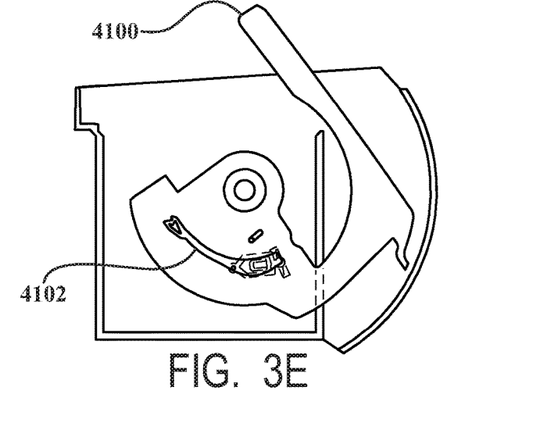
Figures 4A, 4B:
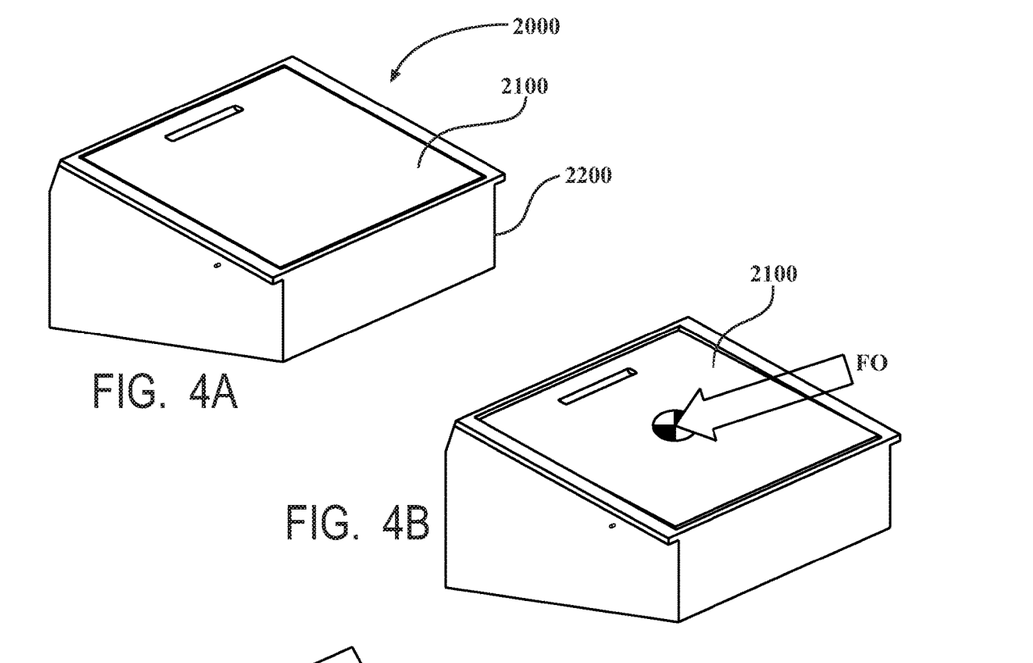
FIGS. 4A through 4D are schematic perspective views of a vehicle interior component shown as a console assembly according to an exemplary embodiment.
Figures 4C, 4D:
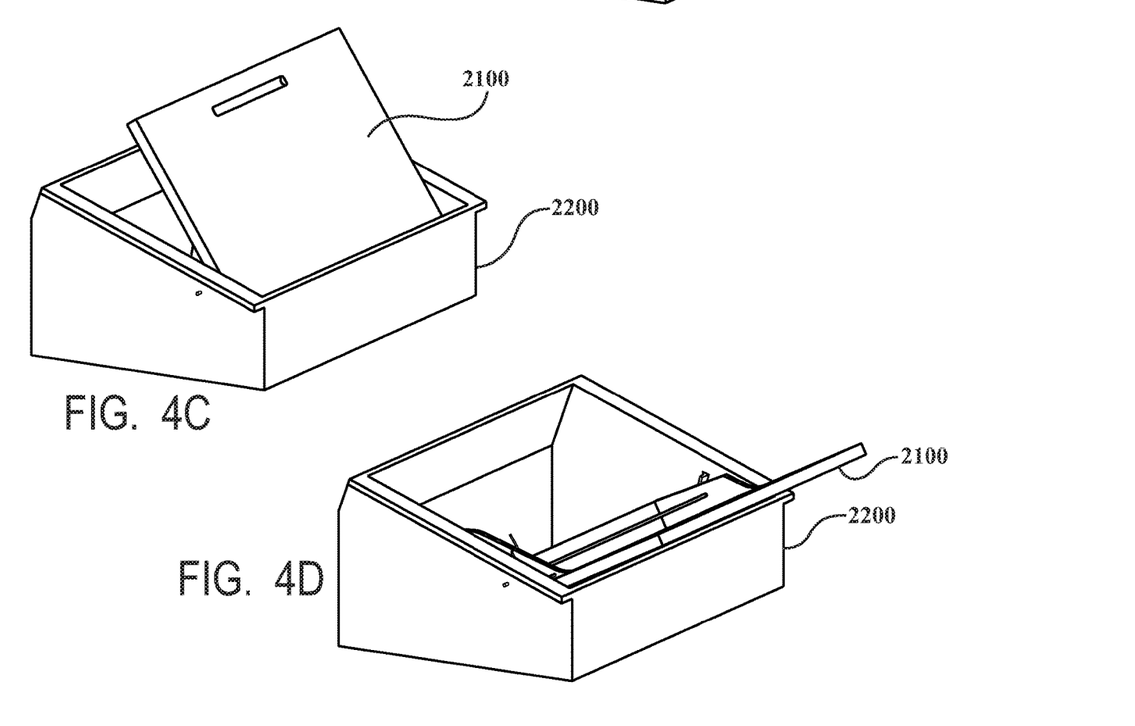

According to an exemplary embodiment as shown schematically in FIGS. 2A-2D, 3A-3E, 5A-5F and 6A-6L, a component 4000 for a vehicle interior may be configured for use in a vehicle subjected in operation to at least one external force such as an applied force and may comprise a base 4200 comprising a bin or storage compartment SC; a cover 4100 configured to move between (a) a closed position (as shown schematically in FIGS. 2A, 3B, 5E and 6D) to cover bin SC and (b) an open position (as shown schematically in FIGS. 2D, and 3E) to uncover bin SC; a latch mechanism 4500 configured to (a) hold cover 4100 in the closed position (as shown schematically in FIG. 3B); (b) release cover 4100 (as shown schematically in FIG. 3C) to facilitate movement of cover 4100 toward the open position; and a blocker mechanism 4300 configured to move from a default position to a blocking position to prevent cover 4100 from moving toward the open position in response to the applied force exceeding a predetermined amount.

Figures 5A, 5B, 5C, 5D, 5E, 5F:
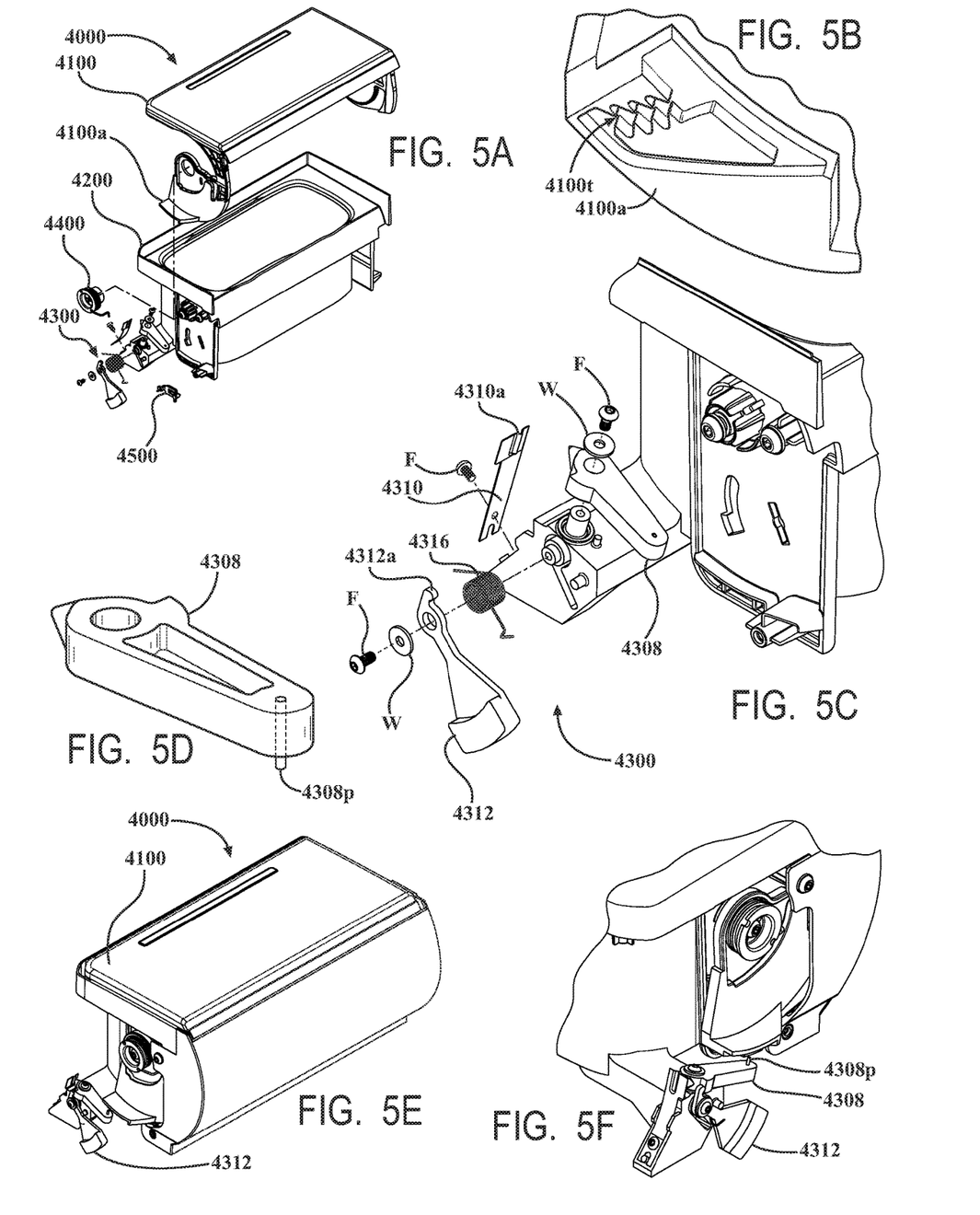
FIG. 5A is a schematic exploded perspective view of a vehicle interior component shown as a console assembly according to an exemplary embodiment.
FIG. 5B is a schematic cut-away perspective view of a vehicle interior component shown as a console assembly according to an exemplary embodiment.
FIG. 5C is a schematic exploded perspective view of a mechanism of a vehicle interior component shown as a console assembly according to an exemplary embodiment.
FIG. 5D is a schematic perspective view of a component of a mechanism of a vehicle interior component shown as a console assembly according to an exemplary embodiment.
FIG. 5E is a schematic perspective view of a vehicle interior component shown as a console assembly according to an exemplary embodiment.
FIG. 5F is a schematic cut-away perspective view of a vehicle interior component shown as a console assembly according to an exemplary embodiment.

According to an exemplary embodiment as shown schematically in FIGS. 2A-2D, 3A-3E, 5A-5F and 6A-6L, cover 4100 may be configured for movement to (a) a first state with cover 4100 retained by latch mechanism 4500 in the closed position (as shown schematically in FIGS. 5E and 5F); (b) a second state with cover 4100 retained by blocker mechanism 4300 in the closed position (as shown schematically in FIGS. 6D-6F); (c) a third state with cover 4100 released from blocker mechanism 4300 in the closed position; (d) a fourth state with cover 4100 in the open position. Blocker mechanism 4300 may be configured to move from the blocking position to a second blocking position to prevent cover 4100 from moving toward the open position. Blocker mechanism 4300 may be configured to move from the blocking position to the second blocking position in response to an actuating force applied to cover 4100. Blocker mechanism 4300 may be configured to move (a) from the blocking position to a second blocking position to prevent cover 4100 from moving from the closed position toward the open position; and (b) from the second blocking position to the default position to facilitate movement of cover 4100 toward the open position. Blocker mechanism 4300 may comprise a pin 4308p and a catch 4100a. Catch 4100a may comprise a track 4100t; pin 4308p may be configured to move within track 4100t. Blocker mechanism 4300 may comprise an arm 4312 configured to hold blocker mechanism 4300 in the default position. Arm 4312 may be configured to allow movement of blocker mechanism 4300 from the default position to the blocking position in response to the applied force exceeding the predetermined amount. Arm 4312 may comprise a pendulum. Blocker mechanism 4300 may comprise a spring 4316 configured to bias arm 4312 to hold blocker mechanism 4300 in the default position.

According to an exemplary embodiment as shown schematically in FIGS. 2A-2D, 3A-3E, 5A-5F and 6A-6L, blocker mechanism 4300 may be configured to hold cover 4100 in the closed position.

According to an exemplary embodiment as shown schematically in FIGS. 2A-2D, 3A-3E, 5A-5F and 6A-6L, blocker mechanism 4300 may comprise a pin 4308p and a catch 4100a; cover 4100 may comprise catch 4100a; pin 4308p may be configured to move relative to cover 4100 in response to the applied force exceeding a predetermined amount.

According to an exemplary embodiment as shown schematically in FIGS. 2A-2D, 3A-3E, 5A-5F and 6A-6L, blocker mechanism 4300 may be configured to move from the blocking position to a second blocking position to prevent cover 4100 from moving toward the open position.

According to an exemplary embodiment as shown schematically in FIGS. 2A-2D, 3A-3E, 5A-5F and 6A-6L, blocker mechanism 4300 may be configured to release cover 4100 to facilitate movement of cover 4100 toward the open position in response to (a) a first actuating force applied to cover 4100; (b) release of the first actuating force; and (c) a second actuating force applied to cover 4100.

Figures 6A, 6B, 6C:
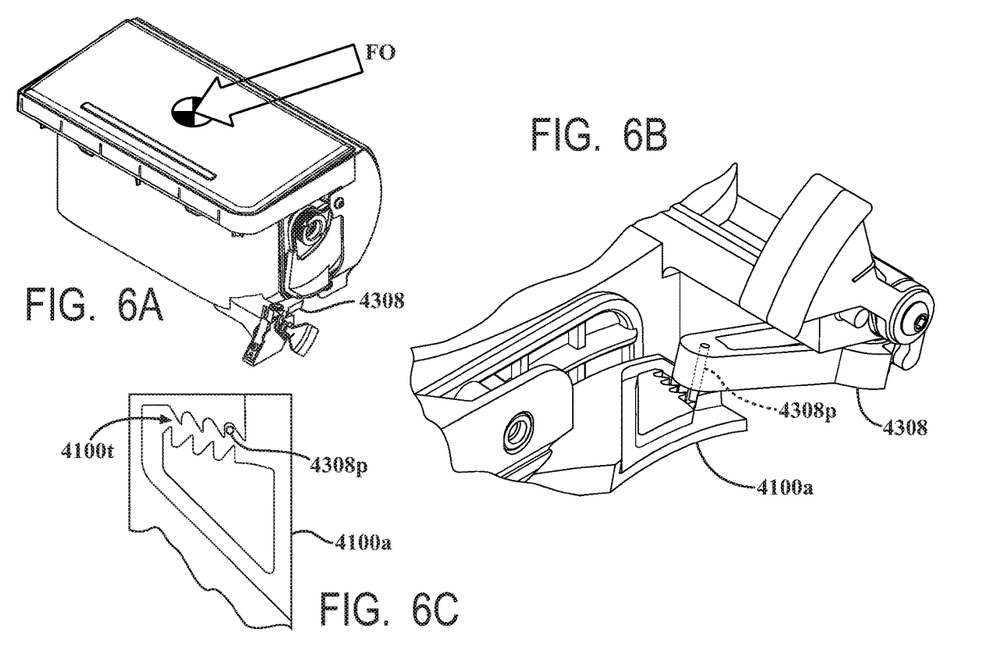
FIG. 6A is a schematic perspective view of a vehicle interior component shown as a console assembly according to an exemplary embodiment.
FIG. 6B is a schematic cut-away perspective view of a vehicle interior component shown as a console assembly according to an exemplary embodiment.
FIG. 6C is a schematic cut-away section view of a vehicle interior component shown as a console assembly according to an exemplary embodiment.

According to an exemplary embodiment as shown schematically in FIGS. 6A-6C, blocker mechanism 4300 may be configured to move from a retracted position to an extended position in response to an applied force exceeding a predetermined amount. Blocker 4308 and pin 4308p may rotate relative to at least one of (a) cover 4100; (b) base 4200 to engage pin 4308p with catch 4100a. Blocker mechanism 4300 may be configured to move from a default position toward a blocking position to prevent cover 4100 from moving toward the open position in response to the applied force exceeding a predetermined amount.

Figures 6D, 6E, 6F:
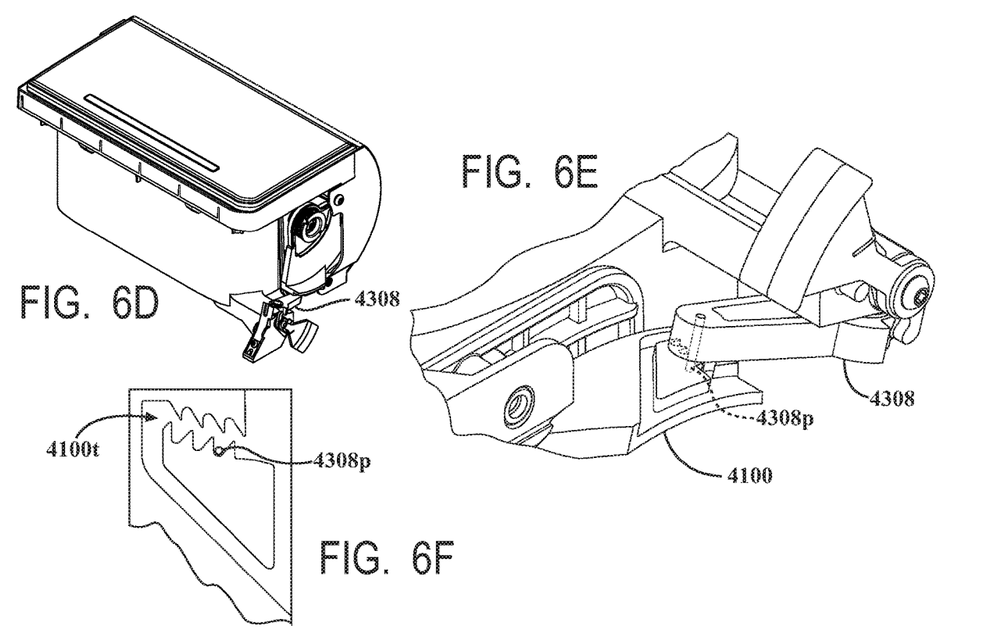
FIG. 6D is a schematic perspective view of a vehicle interior component shown as a console assembly according to an exemplary embodiment.
FIG. 6E is a schematic cut-away perspective view of a vehicle interior component shown as a console assembly according to an exemplary embodiment.
FIG. 6F is a schematic cut-away section view of a vehicle interior component shown as a console assembly according to an exemplary embodiment.

According to an exemplary embodiment as shown schematically in FIGS. 6D-6F, cover 4100 may move to a second state with cover 4100 retained by blocker mechanism 4300 in the closed position. Blocker mechanism 4300 may be configured for a blocking position to prevent cover 4100 from moving toward the open position in response to the applied force exceeding a predetermined amount. Blocker mechanism 4300 may be configured to hold cover 4100 in the closed position. Pin 4308p may be configured to move relative to cover 4100 in response to the applied force exceeding a predetermined amount.

Figure 6G:
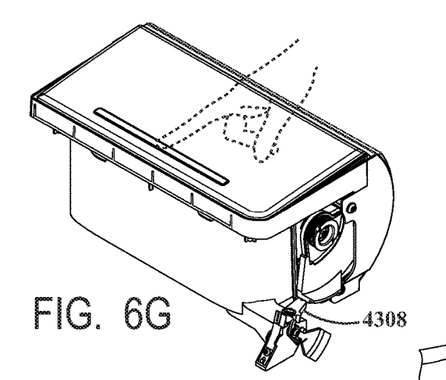
FIG. 6G is a schematic perspective view of a vehicle interior component shown as a console assembly according to an exemplary embodiment.
Figure 6H:
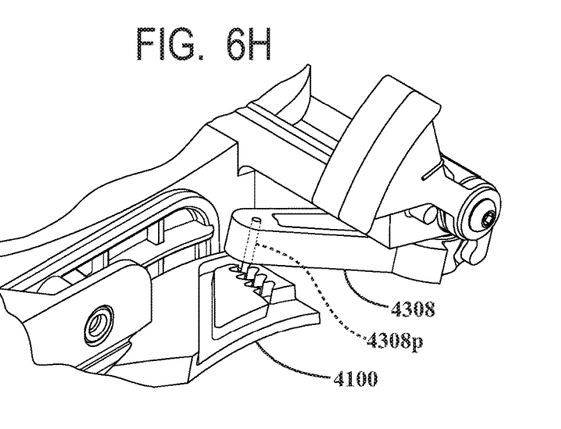
FIG. 6H is a schematic cut-away perspective view of a vehicle interior component shown as a console assembly according to an exemplary embodiment.
Figure 6I:
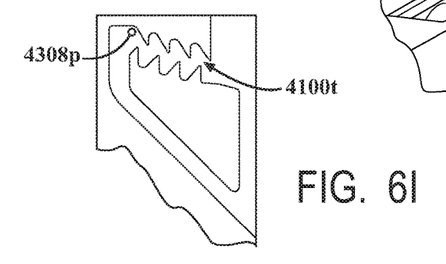
FIG. 6I is a schematic cut-away section view of a vehicle interior component shown as a console assembly according to an exemplary embodiment.

According to an exemplary embodiment as shown schematically in FIGS. 6G-6I, cover 4100 may move to an over-travel or bottomed out position in response to application of a force on cover 4100 (an attempt to unlatch cover 4100 from base 4200). Pin 4308p make move relative to cover 4100 within track 4100t.

Figure 6J:
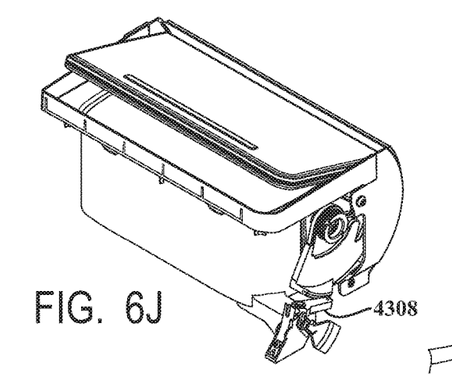
FIG. 6J is a schematic perspective view of a vehicle interior component shown as a console assembly according to an exemplary embodiment.
Figure 6K:
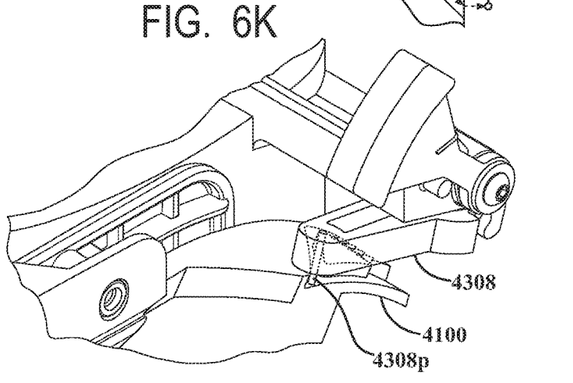
FIG. 6K is a schematic cut-away perspective view of a vehicle interior component shown as a console assembly according to an exemplary embodiment.
Figure 6L:
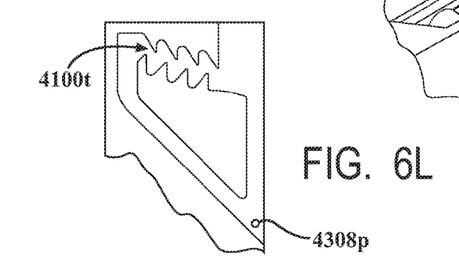
FIG. 6L is a schematic cut-away section view of a vehicle interior component shown as a console assembly according to an exemplary embodiment.

According to an exemplary embodiment as shown schematically in FIGS. 6J-6L, cover 4100 may be released from blocker mechanism 4300 to allow cover 4100 to move toward the open position.

Figure 6M:
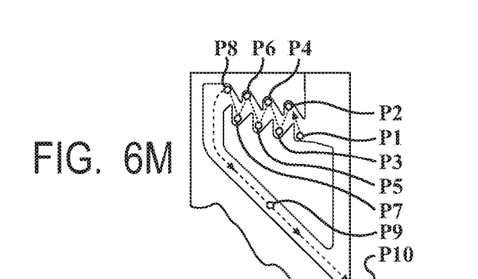
FIG. 6M is a schematic cut-away section view of a vehicle interior component shown as a console assembly showing a path of movement of a pin according to an exemplary embodiment.

According to an exemplary embodiment as shown schematically in FIG. 6M, pin 4308p may be configured to move relative to catch 4100a between points (a) P1 and P2 during application of an inertia force; (b) P3 after application of the inertia force; (c) P4 at application of a first push attempt with cover 4100 in an over-travel or bottomed out position; (d) P5 after application of the first push attempt with cover 4100 in the closed position; (e) P6 at application of a second push attempt with cover 4100 in the over-travel or bottomed out position; (f) P7 after application of the second push attempt with cover 4100 in the closed position; (g) P8 at application of a third push attempt with cover 4100 in the over-travel or bottomed out position; (h) P9 after application of the third push attempt with cover 4100 moving toward the open position. See FIGS. 6A-6L. Blocker mechanism 4300 may be configured to move (a) from the blocking position (as shown schematically at point P3) to a second blocking position (as shown schematically at point P5) to prevent cover 4100 from moving from the closed position toward the open position; and (b) from the second blocking position toward the default position (as shown schematically at point P9) to facilitate movement of cover 4100 toward the open position. Blocker mechanism 4300 may be configured to move to a third blocking position (as shown schematically at point P7) to prevent cover 4100 from moving from the closed position toward the open position.

The event comprising application of an external force greater than a threshold force to the vehicle may comprise an event such as a rollover, a forward collision, a rearward collision, an impact, an accident, etc.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured for use in a vehicle that may be subjected to an event comprising application of an external force greater than a threshold force to the vehicle comprising:
   a base;
   a cover configured to move between a closed position and an open position relative to the base;
   a latch mechanism configured to retain the cover in the closed position; and
   a catch mechanism configured for actuation to a blocked position during the event to retain the cover in the closed position and blocked from movement to the open position;
   wherein the catch mechanism is configured for actuation to an unblocked position to release the cover from the closed position;
   wherein the catch mechanism is configured to be actuated from the blocked position to the unblocked position in order to move the cover from the closed position to the open position;
   wherein actuation of the catch mechanism from the blocked position to the unblocked position comprises (a) movement at the catch mechanism from a retained state toward a transition state with the cover retained in the closed position and (b) movement at the catch mechanism from a retained state to a release state with the cover able to move toward the open position.

2. The component of claim 1 wherein actuation of the catch mechanism from the blocked position to the unblocked position comprises (a) movement at the catch mechanism from a retained state (P3, P5) toward a transition state (P4, P6) with the cover retained in the closed position and (b) movement at the catch mechanism from a retained state (P7) toward a release state (P8) with the cover able to move toward the open position.

3. The component of claim 2 wherein actuation of the catch mechanism to the blocked position comprises movement at the catch mechanism to the retained state (P3).

4. The component of claim 2 wherein actuation of the catch mechanism to the unblocked position comprises movement at the catch mechanism to the release state (P8).

5. The component of claim 1 wherein actuation of the catch mechanism from the blocked position to the unblocked position comprises (a) movement at the catch mechanism from a retained state (P3) toward a transition state (P4) with the cover retained in the closed position and (b) movement at the catch mechanism from a retained state (P5) toward a transition state (P6) with the cover retained in the closed position and (c) movement at the catch mechanism from a retained state (P7) toward a release state (P8) with the cover able to move toward the open position.

6. The component of claim 1 wherein movement at the catch mechanism comprises movement of the cover by application of force.

7. The component of claim 1 wherein the catch mechanism is configured for movement from a transition state to a retained state.

8. The component of claim 1 wherein the catch mechanism comprises a catch and an arm configured to engage the catch.

9. The component of claim 8 wherein the cover comprises the catch and the base comprises the arm.

10. The component of claim 8 wherein the catch comprises a track and the arm comprises a pin configured to engage the track.

11. The component of claim 8 wherein the catch mechanism comprises a spring configured to bias the arm to retain the catch mechanism in a default position so that the cover can be moved to the open position.

12. The component of claim 8 wherein movement at the catch mechanism comprises movement of the arm relative to the catch and movement of the catch relative to the arm.

13. The component of claim 1 wherein actuation of the catch mechanism from the blocked position to the unblocked position comprises (a) application of force to provide movement at the catch mechanism from a retained state (P3) to a transition state (P4) and (b) application of force to provide movement at the catch mechanism from a retained state (P7) to a release state (P8).

14. A component for a vehicle interior configured for use in a vehicle that may be subjected to an event comprising application of an external force greater than a threshold force to the vehicle comprising:
- a base;
- a cover configured to move between a closed position and an open position relative to the base;
- a latch mechanism configured to retain the cover in the closed position; and
- a catch mechanism configured for actuation to a blocked position during the event to retain the cover in the closed position and blocked from movement to the open position;
- wherein the catch mechanism is configured for actuation to an unblocked position following the event to release the cover from the closed position;
- wherein the catch mechanism is configured to be actuated from the blocked position to the unblocked position in order to move the cover from the closed position to the open position;
- wherein actuation of the catch mechanism from the blocked position to the unblocked position comprises (a) application of force to provide movement at the catch mechanism from a retained state to a transition state and (b) application of force to provide movement at the catch mechanism from a retained state to a release state.

15. The component of claim 14 wherein actuation of the catch mechanism from the blocked position to the unblocked position comprises (a) movement at the catch mechanism from a retained state (P3) toward a transition state (P4) with the cover retained in the closed position and (b) movement at the catch mechanism from a retained state (P7) toward a release state (P8) with the cover able to move toward the open position.

16. The component of claim 14 wherein the catch mechanism is configured so that (a) the cover is retained in the closed position after application of force to provide movement at the catch mechanism from a retained state to a transition state and (b) the cover is able to move toward the open position after application of force to provide movement at the catch mechanism from a retained state to a release state.

17. The component of claim 14 wherein the catch mechanism comprises a blocker; wherein movement at the catch mechanism to the blocked position comprises application of force greater than the threshold force.

18. A component for a vehicle interior configured for use in a vehicle that may be subjected to an event comprising application of an external force greater than a threshold force to the vehicle comprising:
- a base;
- a cover configured to move between a closed position and an open position relative to the base;
- a latch mechanism configured to retain the cover in the closed position; and
- a catch mechanism configured for actuation to a blocked position during the event to retain the cover in the closed position and blocked from movement to the open position;
- wherein the catch mechanism is configured for actuation to an unblocked position to release the cover from the closed position;
- wherein the catch mechanism is configured to be actuated from the blocked position to the unblocked position in order to move the cover from the closed position to the open position;
- wherein the catch mechanism comprises a catch on the cover and an arm on the base;
- wherein the catch comprises a track and the arm comprises a pin configured to engage the track.

19. The component of claim 18 wherein actuation of the catch mechanism from the blocked position to the unblocked position comprises (a) movement at the catch mechanism from a retained state (P3) toward a transition state (P4) with the cover retained in the closed position and (b) movement at the catch mechanism from a retained state (P7) to a release state (P8) with the cover able to move toward the open position.

20. The component of claim 18 wherein actuation of the catch mechanism from the blocked position to the unblocked position comprises (a) application of force to provide movement at the catch mechanism from a retained state (P3) to a transition state (P4) and (b) application of force to provide movement at the catch mechanism from a retained state (P7) to a release state (P8).

\* \* \* \* \*